US009229746B2

(12) United States Patent
Indukuru et al.

(10) Patent No.: US 9,229,746 B2
(45) Date of Patent: *Jan. 5, 2016

(54) IDENTIFYING LOAD-HIT-STORE CONFLICTS

(71) Applicant: International Business Machines Corporation, Armonk, NY (US)

(72) Inventors: Venkat R. Indukuru, Austin, TX (US); Alexander E. Mericas, Austin, TX (US); Satish K. Sadasivam, Erode (IN); Madhavi G. Valluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/109,996

(22) Filed: Dec. 18, 2013

(65) Prior Publication Data

US 2014/0108770 A1   Apr. 17, 2014

Related U.S. Application Data

(63) Continuation of application No. 13/611,006, filed on Sep. 12, 2012.

(51) Int. Cl.
*G06F 9/00*   (2006.01)
*G06F 9/445*  (2006.01)
*G06F 9/38*   (2006.01)

(52) U.S. Cl.
CPC .......... *G06F 9/44552* (2013.01); *G06F 9/3834* (2013.01)

(58) Field of Classification Search
CPC ........................... G06F 9/44552; G06F 9/3834
See application file for complete search history.

(56) References Cited

U.S. PATENT DOCUMENTS

| 4,623,962 | A |   | 11/1986 | Matsumoto et al. |
| 5,261,071 | A | * | 11/1993 | Lyon .............................. 711/140 |
| 6,009,516 | A |   | 12/1999 | Steiss et al. |

(Continued)

OTHER PUBLICATIONS

Kistler M. and Brokenshire D. "Detecting Race Conditions in Asynchronous DMA Operations with Full System Simulation". Symposium Article. 2011 IEEE International Symposium on Performance Analysis of Systems & Software. IEEE Computer Society, US. pp. 207-215.

(Continued)

*Primary Examiner* — Zachary K Huson
(74) *Attorney, Agent, or Firm* — Jinesh Patel; Steven L. Bennett

(57) ABSTRACT

A computing device identifies a load instruction and store instruction pair that causes a load-hit-store conflict. A processor tags a first load instruction that instructs the processor to load a first data set from memory. The processor stores an address at which the first load instruction is located in memory in a special purpose register. The processor determines where the first load instruction has a load-hit-store conflict with a first store instruction. If the processor determines the first load instruction has a load-hit store conflict with the first store instruction, the processor stores an address at which the first data set is located in memory in a second special purpose register, tags the first data set being stored by the first store instruction, stores an address at which the first store instruction is located in memory in a third special purpose register and increases a conflict counter.

3 Claims, 4 Drawing Sheets

(56) References Cited

U.S. PATENT DOCUMENTS 6,963,962 B2   11/2005   Ramagopal et al.
2009/0006767 A1   1/2009   Saha et al.

OTHER PUBLICATIONS

"Method and Apparatus for the Optimization of Store Write-Back Latency in a Microprocessor". Technical Disclosure. IP.com Prior Art Database. IP.com No. IPCOM000213189D. IP.com Electronic Publication: Dec. 7, 2011.

"Process for Computing Dynamic Memory Conflict Information". Technical Disclosure. IP.com Prior Art Database. IP.com No. IPCOM000152733D. IP.com Electronic Publication: May 10, 2007.

U.S. Appl. No. 13/611,006, entitled "Identifying Load-Hit-Store Conflicts", filed Sep. 12, 2012.

* cited by examiner

IDENTIFYING LOAD-HIT-STORE CONFLICTS

CROSS REFERENCE TO RELATED APPLICATION

This application is a Continuation Application of pending U.S. patent application Ser. No. 13/611,006 filed Sep. 12, 2012.

FIELD OF THE INVENTION

The present invention relates generally to load-hit-store conflicts, and more particularly to a method for identifying load and store instructions and data addresses involved in load-hit-store conflicts.

BACKGROUND

In a typical computing device, load and store instructions handle all data movement between processor registers, memory and peripherals. Load instructions are used to load data from memory into a processor register. Store instructions, on the other hands, are used to store data from a processor register into memory. Both types of instructions specify a data effective address which identifies the address in memory where the data to be stored or loaded is located.

Load-hit-store (LHS) conflicts are a common source of performance issues on POWER™ processors. LHS conflicts occur when a load instruction instructs a processor to load data from an address before the data has been stored to the address by a store instruction.

Often, functions which are only a few steps cause LHS conflicts because the function prologue (store instruction) and the function epilogue (load instruction) are temporally close. In many cases, static and dynamic compilers can resolve the LHS conflicts by inlining the function code. Inlining denotes the process of inserting the complete body of a function in every place that the function is called, which eliminates the time overhead associated with the function call. Replacing the function call with the body of the function results in the removal of the function prologue (store instruction) and function epilogue (load instruction) from the function code since the purpose served by the function prologue (to save the data present in the registers before execution of the function in memory) and the function epilogue (to load the saved data back into the registers) is no longer necessary. Removing the function prologue (store instruction) and the function epilogue (load instruction) from the code, eliminates the possibility of a load-hit-store conflict occurring. Typically, a compiler can eliminate an LHS conflict, via inlining or a similar process, if it can detect the store and load instruction pair that is at the root of the LHS conflict. When the store and load instruction pair is spatially close they can be easily identified by the compiler.

For some LHS conflicts, where the store instruction and the load instruction are not spatially close but still temporally close enough in execution that a LHS conflict is caused, it can be hard to identify the store/load instruction pair causing the LHS conflict. In current POWER™ processors, there are mechanisms where the code is profiled in order to identify a load that causes an LHS conflict. However, there are no code profiling mechanisms to identify the corresponding stores involved in the LHS conflict. Without this information, the compiler has to examine all previous stores until a store is found whose address matches the data address specified in the load instructions. Once the compiler finds the matching store, inlining or a similar process may be used to resolve the LHS conflict. However, searching through previous stores is inefficient and can increase the overhead for static and dynamic compilers immensely.

SUMMARY

Embodiments of the present invention provide a system, method, and program product for identifying of a load instruction and store instruction pair that causes a load-hit-store conflict. A processor tags a first load instruction that instructs the processor to load a first data set from memory. The processor stores an address at which the first load instruction is located in memory in a special purpose register. The processor determines where the first load instruction has a load-hit-store conflict with a first store instruction, wherein the load-hit-store conflict occurs when the second load instruction instructs the processor to load the second data set from memory before the second data set has been stored into memory by the second store instruction. If the processor determines the first load instruction has a load-hit store conflict with the first store instruction, the processor stores an address at which the first data set is located in memory in a second special purpose register, tags the first data set being stored by the first store instruction, stores an address at which the first store instruction is located in memory in a third special purpose register and increases a conflict counter.

DETAILED DESCRIPTION

Figure 1:
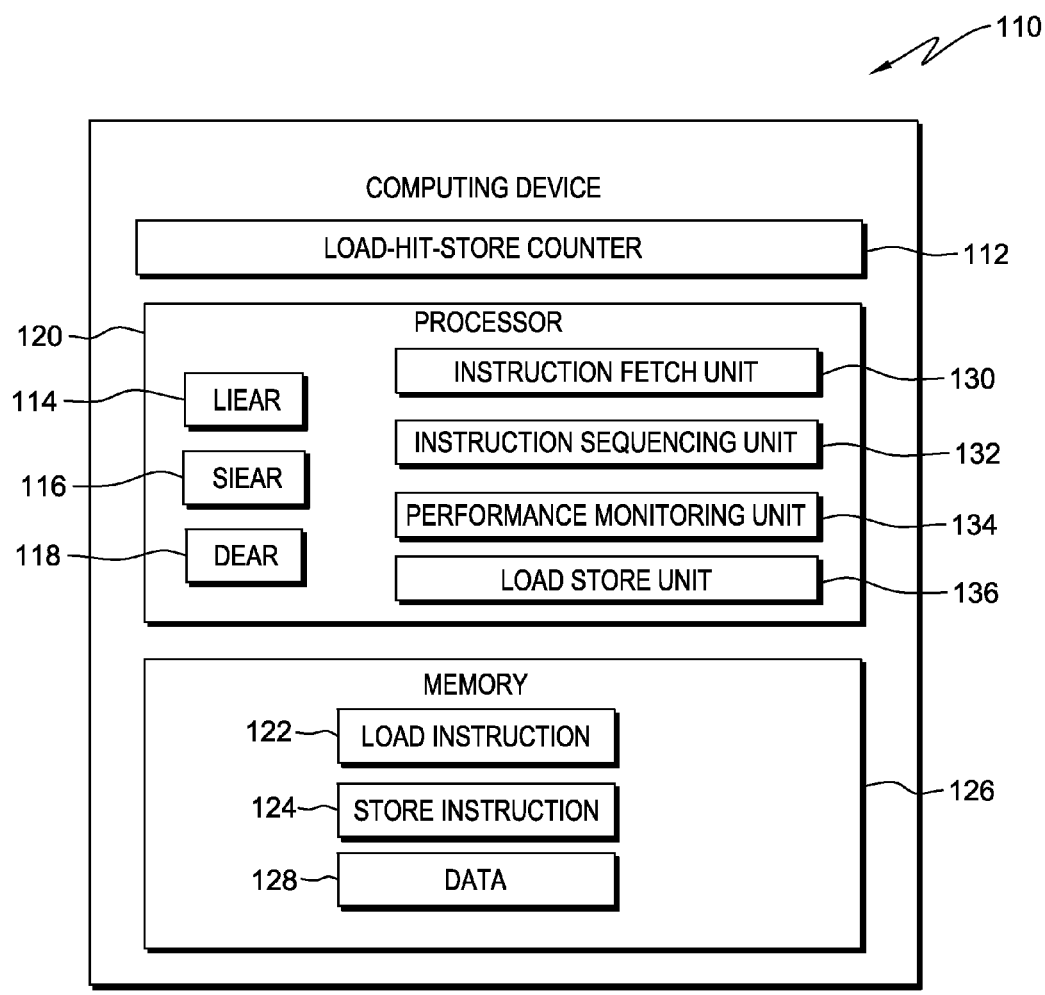
FIG. 1 illustrates a computing device for load-hit-store conflict identification, in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates computing device 110, in accordance with an embodiment of the invention. Computing device 110 includes load-hit-store counter 112, processor 120, and memory 126. Computing device 110 may be a desktop computer, a notebook, a laptop computer, a tablet computer, a handheld device, a smart-phone, a thin client, or any other electronic device or computing system capable of executing program instructions. Computing device 110 is described in more detail with reference to FIG. 4.

Processor 120 includes load instruction effective address register (LIEAR) 114, store instruction effective address register (SIEAR) 116, data effective address register (DEAR) 118, instruction fetch unit 130, instruction sequencing unit 132, performance monitoring unit 134, and load store unit 136. In general, processor 120 is a hardware device capable of performing an instruction cycle. An instruction cycle is the process by which processor 120 retrieves a program instruction from memory 126, determines what actions the instruction requires, and executes those actions.

Instruction fetch unit 130 is the portion of processor 120 dedicated to fetching and decoding instructions. Instruction sequencing unit 132 is the portion of processor 120 dedicated to organizing the order of execution of the instructions fetched by instruction fetch unit 130. Performance monitoring unit 134 is the portion of processor 120 dedicated to monitoring for performance conflicts, such as load-hit-store conflicts, that may occur while the fetched instructions are being executed. Load store unit 136 is the portion of processor 120 dedicated to loading data from memory 126 into a register of processor 120 (for load instructions) or storing data back to memory 126 from a register of processor 120 (for store instructions).

LIEAR 114 is a register of processor 120 dedicated to storing the effective address of load instructions. The term "effective address" refers to the address where a data set, in this case a load instruction, is stored in memory 126. In an exemplary embodiment, when a load instruction is fetched and decoded by instruction fetch unit 130, the effective address of the load instruction is stored in LIEAR 114 by load store unit 136. Storing the effective address of the load instruction can be valuable if the load instruction becomes involved in a load-hit-store conflict or a similar performance conflict. The importance of storing the effective address of the load instruction is explained in further detail below, with regard to FIGS. 2 and 3.

DEAR 118 is a register of processor 120 dedicated to storing the effective address of a particular data set that is being loaded by load store unit 136. Storing the effective address of a particular data set can be valuable when determining the specific data set that is responsible for a load-hit-store conflict. For example, if a load instruction conflicts with a previous store there is a resulting load-hit-store conflict. However, a load instruction may instruct processor 120 to load several different data sets located in various locations in memory 126. Having the effective address of the data set that is at the heart of the load-hit-store conflict informs processor 120 which portion of the load instruction is creating the conflict. The importance of storing the effective address of a data set being loaded is explained in further detail below, with regard to FIGS. 2 and 3.

SIEAR 116 is a register of processor 120 dedicated to storing the effective address of store instructions. In an exemplary embodiment, when a store instruction is fetched and decoded by instruction fetch unit 130, the effective address of the store instruction is stored in SIEAR 116 by load store unit 136. Storing the effective address of a store instruction can be valuable if the store instruction becomes involved in a load-hit-store conflict or a similar performance conflict.

Load-hit-store counter 112 is a hardware device or sequence of dedicated circuits that counts the number of load-hit-store conflicts that occur in computing device 110. In an exemplary embodiment, load-hit-store counter 112 operates in conjunction with software that specifies a threshold value of load-hit-store conflicts. When the number of the load-hit-store conflicts exceeds the specified threshold value, an interrupt is generated by processor 120. An interrupt causes processor 120 to stop its current state of execution and begin execution of an interrupt handler or interrupt service routine. What the interrupt service routine is depends on the reason that the interrupt was generated. The generation of the interrupt by processor 120 and the corresponding interrupt service routine will be explained in further detail with regard to FIGS. 2 and 3.

Memory 126 includes load instruction 122, store instruction 124, and data 128. In an exemplary embodiment, memory 126 is a computer readable tangible storage device such as RAM (random access memory). Memory 126 will be described in further detail with regard to FIG. 4.

Data 128 is digital information stored in memory 126. In an exemplary embodiment, data 128 is loaded into memory 126 via load instruction 122 and stored into memory 126 via store instruction 124.

Load instruction 122 is program code that instructs processor 120 to load a specific set of data, i.e., data 128, from memory 126. In an exemplary embodiment, load instruction 122 is tagged by performance monitoring unit 134 after load instruction 122 is decoded by instruction fetch unit 130. In the exemplary embodiment, load instruction 122 is a single instruction within a larger set of program code which performs a specific function. The tagging of load instruction 122 is explained in further detail with reference to FIGS. 2 and 3.

Store instruction 124 is program code that instructs processor 120 to store a specific set of data, i.e., data 128, into memory 126. In an exemplary embodiment, store instruction 124 is involved in a load-hit-store conflict with load instruction 122. In the exemplary embodiment, store instruction 124 is a single instruction within a larger set of program code which performs a specific function.

Figure 2:
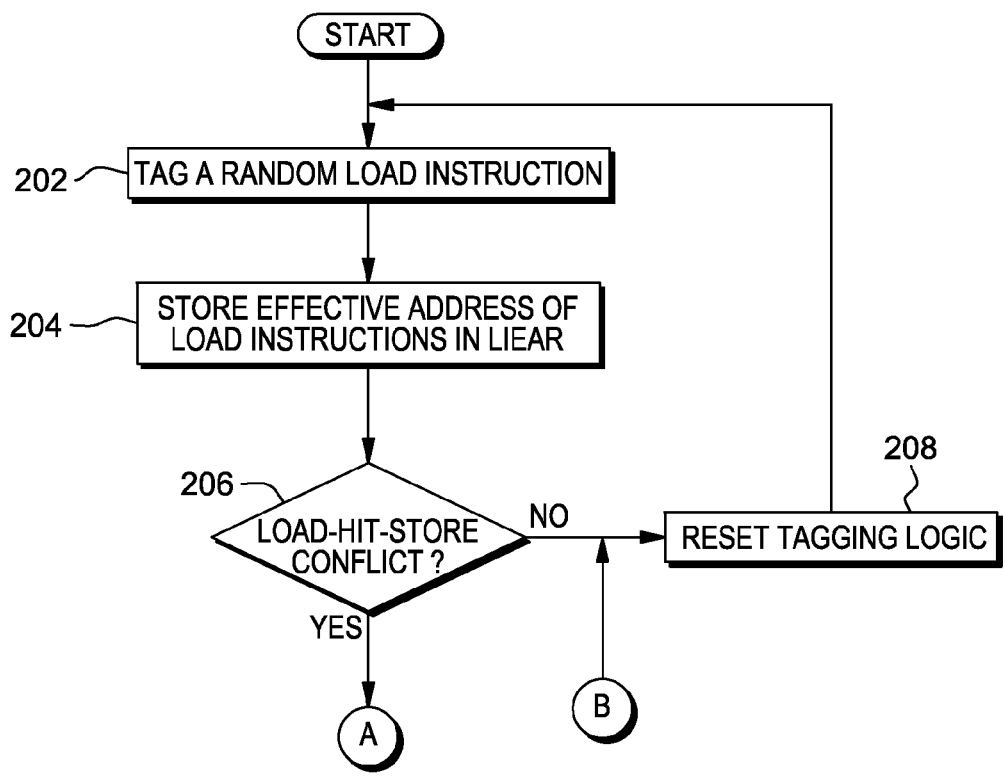
FIGS. 2 and 3 are flowcharts illustrating the operations of a processor in identifying the store and load instruction pair involved in a load-hit-store conflict, in accordance with an embodiment of the invention.
Figure 3:
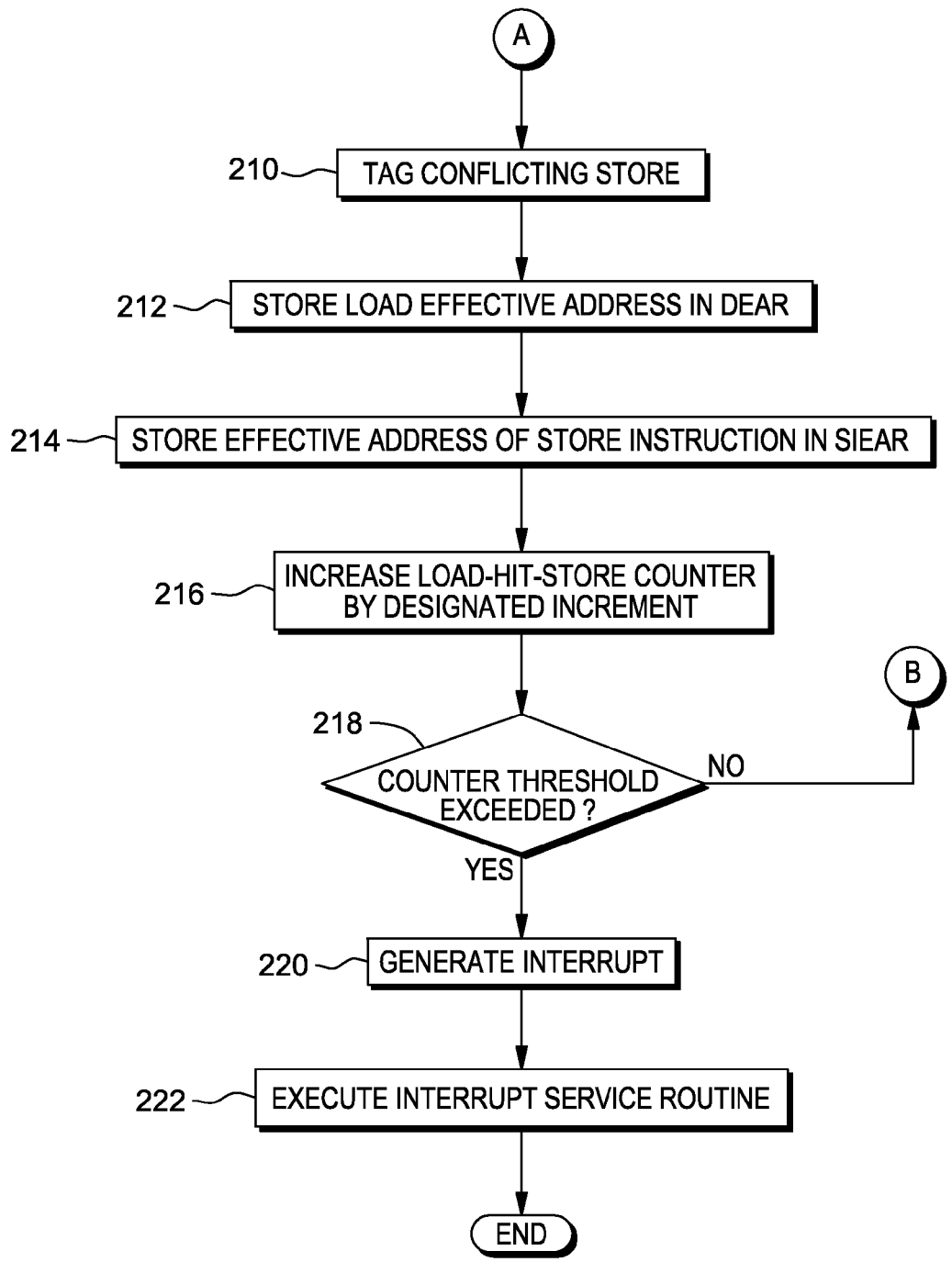

FIGS. 2 and 3 are a flowchart illustrating the operations of processor 120 in identifying load and store instruction pairs involved in load-hit-store conflicts, in accordance with an exemplary embodiment of the invention. In an exemplary embodiment, performance monitoring unit 134 tags load instruction 122, after load instruction 122 has been fetched and decoded by instruction fetch unit 130 (step 202). In the exemplary embodiment, load instruction 122 instructs processor 120 to load data 128 from memory 126. Performance monitoring unit 134 tags a bit of load instruction 122, known herein as the "load tracking bit". The load tracking bit is part of the metadata of load instruction 122. When performance monitoring unit 134 tags the load tracking bit of load instruction 122, the load tracking bit changes from 0 to 1, which notifies load store unit 136 that load instruction 122 is to be monitored for load-hit-store conflicts. In the exemplary embodiment, load instruction 122 is chosen to be tagged at random by performance monitoring unit 134. In another embodiment, every $10^{th}$ load instruction is tagged by performance monitoring unit 134. Load store unit 136 then stores the effective address of load instruction 122 in LIEAR 114 (step 204).

Load store unit 136 then checks to see if load instruction 122 is involved in a load-hit-store conflict with a previous store (decision 206). In an exemplary embodiment, once load instruction 122 is issued by instruction sequencing unit 132, load store unit 136 examines each in-progress data store and determines if the effective address in memory 126 of any data set being stored, i.e., data 128, is the same effective address that load instruction 122 instructs load store unit 136 to load a data set from.

If load store unit 136 does not find an in-progress data store that is storing a data set, i.e., data 128, with an effective address that is the same as the effective address that load instruction 122 instructs load store unit 136 to load a data set from, there is no resulting load-hit-store conflict (decision 206, "NO" branch). In the exemplary embodiment, processor 120 then resets the tagging logic in performance monitoring unit 134 so that a new load instruction is tagged, once again at random (step 208). In the exemplary embodiment, the effective address of load instruction 122 stored in LIEAR 114 (step 204) is deleted if load store unit 136 determines load instruction 122 is not involved in a load-hit-store conflict.

If data 128 has not been fully stored into memory 126 before load store unit 136 is instructed by load instruction 122 to load data 128 from memory 126, resulting in a load-hit-store conflict (decision 206, "YES" branch), load store unit 136 then tags a special tag bit of the conflicting data store, data 128, known herein as a "collision bit", and waits for the data store to complete (step 210). The collision bit is part of the metadata of data 128. When load store unit 136 tags the collision bit of data 128, the collision bit changes from 0 to 1, effectively serving as notification that data 128 has been involved in a collision or load-hit-store conflict. Load store unit 136 then verifies that the load tracking bit of load instruction 122 has been tagged by performance monitoring unit 134. In an exemplary embodiment, after verification by load store unit 136 that the load tracking bit of load instruction 122 has been tagged by performance monitoring unit 134, load store unit 136 stores the effective address of the data, i.e., data 128, in DEAR 118 (step 212). Load store unit 136 then waits for the data store to complete, i.e., waits for data 128 to complete store in memory 126. If the tracking bit of load instruction 122 was not tagged by performance monitoring unit 134, there would still be a load-hit-store conflict but it would not be monitored by processor 120 and therefore the effective address of data 128 would not be stored in DEAR 118. Instead, load store unit 136 would wait until data 128 is completely stored in memory 126 before executing load instruction 122.

Once the data store is complete, i.e., once data 128 is stored in memory 126, load store unit 136 stores the effective address of store instruction 124 in SIEAR 116 (step 214). Load store unit 136 then increases load-hit-store counter 112 by a pre-designated incremental value (step 216). For example, load store unit 136 may increase load-hit-store counter 112 by 1. Load store unit 136 then determines if load-hit-store counter 112 has exceeded the preset threshold value (decision 218). If the threshold value has not been exceeded (decision 218, "NO" branch), load store unit 136 resets the tagging logic so that a new load instruction can be tagged, at random, by performance monitoring unit 134 (step 208).

In an exemplary embodiment, if the threshold value of load-hit store counter 112 is exceeded (decision 218, "YES" branch), load store unit 136 generates an interrupt (step 220). In another embodiment, another part of processor 120, such as performance monitoring unit 134 generates the interrupt. As discussed above, an interrupt causes processor 120 to stop its current state of execution and begin execution of an interrupt handler or interrupt service routine. As a result of the interrupt, processor 120 stops its execution of store and load instructions and begins execution of an interrupt service routine (step 222). In the exemplary embodiment, the interrupt service routine includes processor 120 locking LIEAR 114, SIEAR 116 and DEAR 118 so that no further effective addresses can be stored in these registers, storing the contents of LIEAR 114, SIEAR 116 and DEAR 118 into memory 126, and storing the process ID of the set of program code, which includes load instruction 122 and store instruction 124, and whose execution resulted in the load-hit-store conflict that pushed load-hit-store counter 112 past the preset threshold value, into memory 126. This information can be used by the optimizer and compiler to generate optimized code, by way of inlining for example, which avoids the previously produced load-hit-store conflict. For example, the optimizer can use the process ID to map to the location in memory 126 where each instruction that makes up the set of program code is located. The optimizer then works offline using the contents of the three special purpose registers stored in memory 126, to identify the specific store and load instruction pair within the set of code, store instruction 124 and load instruction 122, which caused the load-hit-store conflict that pushed load-hit-store counter 112 past the preset threshold value, and determine if an effective solution is available to help resolve the conflict. The optimizer then uses inlining or a similar technique to generate optimized code which is then recompiled and made ready for execution by the compiler. This optimized code is used in place of the original program code the next time the program is dispatched to processor 120.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 4:
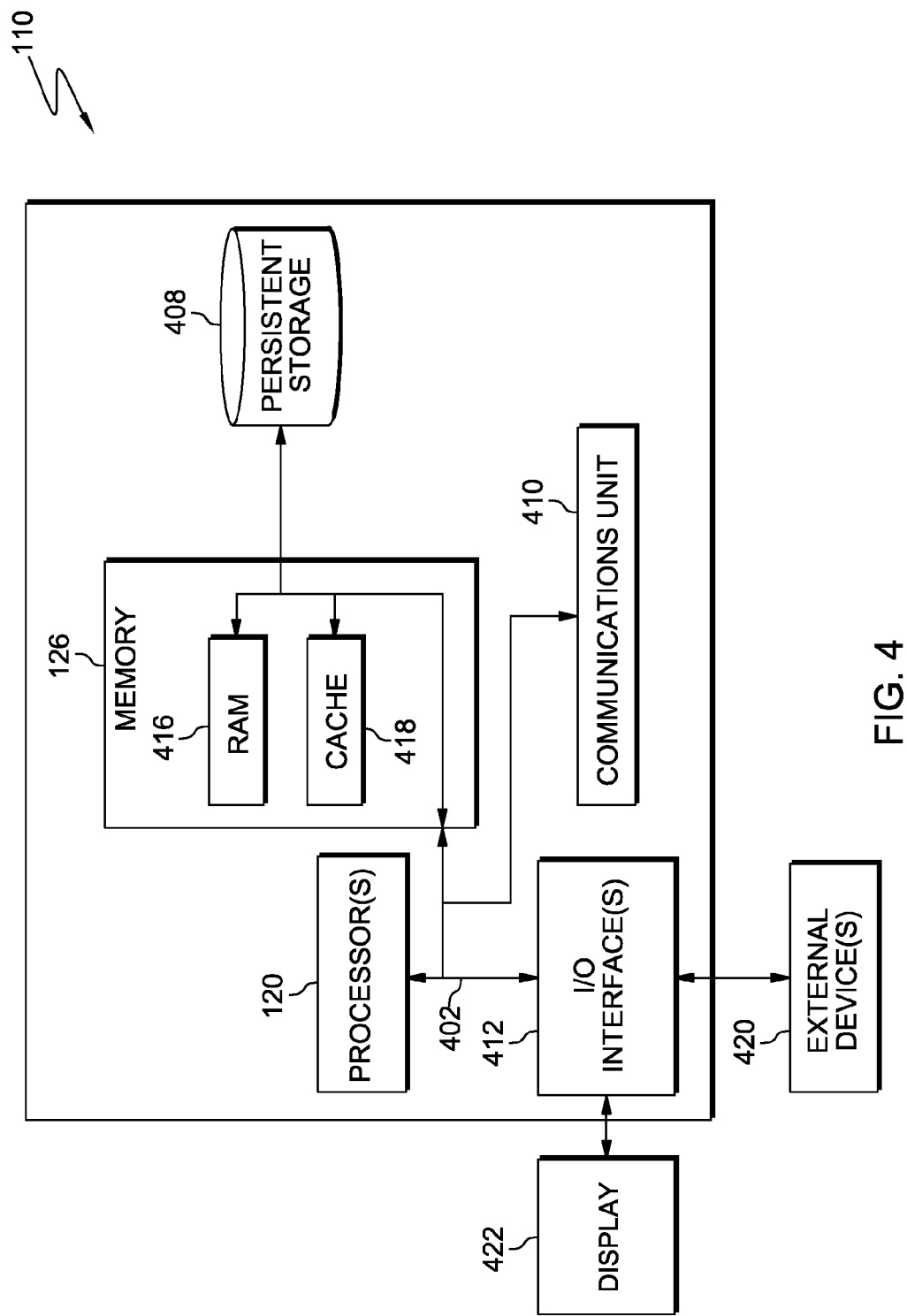
FIG. 4 is a block diagram depicting the hardware components of the load-hit-store conflict identification system of FIG. 1, in accordance with an embodiment of the invention.

FIG. 4 depicts a block diagram of components of computing device 110 in accordance with an illustrative embodiment. It should be appreciated that FIG. 4 provides only an illustration of one implementation and does not imply any limitations with regard to the environment in which different embodiments may be implemented. Many modifications to the depicted environment may be made.

Computing device 110 includes communications fabric 402, which provides communications between computer processor(s) 120, memory 126, persistent storage 408, communications unit 410, and input/output (I/O) interface(s) 412.

Memory 126 and persistent storage 408 are examples of computer-readable tangible storage devices and media. Memory 126 may be, for example, one or more random access memories (RAM) 416, cache 418, or any other suitable volatile or non-volatile storage device.

Programs, such as the optimizing software, are stored in persistent storage 408 for execution by one or more of the respective computer processors 404 via one or more memories of memory 126. In the embodiment illustrated in FIG. 4, persistent storage 408 includes flash memory. Alternatively, or in addition to flash memory, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. Programs, such as the optimizing software, may be downloaded to persistent storage 408 through communications unit 410.

I/O interface(s) 412 allows for input and output of data with other devices that may be connected to computing device 110. For example, I/O interface 412 may provide a connection to external devices 420 such as a keyboard, keypad, a touch screen, and/or some other suitable input device. I/O interface(s) may also connect to display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identification of a load instruction and store instruction pair that causes a load-hit-store conflict, comprising the steps of:
   a processor tagging a first load instruction, wherein the first load instruction instructs the processor to load a first data set from a memory;
   the processor storing in a first special purpose register an address at which the first load instruction is located in memory;

the processor determining whether the first load instruction has a load-hit-store conflict with a first store instruction, wherein the load-hit-store conflict occurs when the first load instruction instructs the processor to load the first data from memory before the first data set has been stored into memory by the first store instruction;

responsive to determining the first load instruction has a load-hit-store conflict with the first store instruction, the processor storing an address at which the first data set is located in memory in a second special purpose register, the processor tagging the first data set being stored by the first store instruction, the processor storing an address at which the first store instruction is located in memory in a third special purpose register, and the processor increasing a conflict counter.

2. The method of claim 1, wherein the step of the processor increasing the conflict counter further comprises the processor generating an interrupt and locking all special purpose registers when the conflict counter surpasses a pre-set threshold value.

3. The method of claim 1, further comprising the steps of:

the processor tagging a second load instruction that instructs the processor to load a second data set from a memory;

the processor storing an address at which the second load instruction is located in memory in the first special purpose register;

the processor determining whether the second load instruction has a load-hit-store conflict with a second store instruction, wherein the load-hit-store conflict occurs when the second load instruction instructs the processor to load the second data set from memory before the second data set has been stored into memory by the second store instruction;

responsive to determining the second load instruction does not have a load-hit-store conflict with the second store instruction, the processor deleting the address at which the second load instruction is located in memory from the first special purpose register.

* * * * *